(12) United States Patent
Wang et al.

(10) Patent No.: US 11,946,555 B2
(45) Date of Patent: Apr. 2, 2024

(54) NUT ASSEMBLY FOR ELECTRONIC EXPANSION VALVE, ELECTRONIC EXPANSION VALVE, AND LIMITING ELEMENT MOUNTING METHOD

(71) Applicant: ZHEJIANG DUNAN ARTIFICIAL ENVIRONMENT CO., LTD., Shaoxing (CN)

(72) Inventors: Xinnan Wang, Shaoxing (CN); Zhijun Kang, Shaoxing (CN); Jian Yang, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 281 days.

(21) Appl. No.: 17/610,152

(22) PCT Filed: May 10, 2020

(86) PCT No.: PCT/CN2020/089503
§ 371 (c)(1),
(2) Date: Nov. 9, 2021

(87) PCT Pub. No.: WO2020/228651
PCT Pub. Date: Nov. 19, 2020

(65) Prior Publication Data
US 2022/0221078 A1    Jul. 14, 2022

(30) Foreign Application Priority Data

May 10, 2019  (CN) .......................... 201910389712.X
May 10, 2019  (CN) .......................... 201920667717.X
Nov. 21, 2019 (CN) .......................... 201911151362.X

(51) Int. Cl.
*F16K 27/02*     (2006.01)
*F16B 21/02*     (2006.01)
(Continued)

(52) U.S. Cl.
CPC .............. *F16K 27/02* (2013.01); *F16B 21/02* (2013.01); *F16B 37/04* (2013.01); *F16K 1/32* (2013.01);
(Continued)

(58) Field of Classification Search
CPC . F16K 27/02; F16K 1/32; F16K 31/02; F16B 21/02; F16B 21/04; F16B 37/04; F25B 2341/06; F25B 41/31; Y02B 30/70
(Continued)

(56) References Cited

U.S. PATENT DOCUMENTS 6,266,964 B1    7/2001 Meyer et al.
8,556,229 B2 *  10/2013 Lv .......................... F16K 31/047
                                                        251/264
(Continued)

FOREIGN PATENT DOCUMENTS

CN    201891900 U    7/2011
CN    103836211 A    6/2014
(Continued)

OTHER PUBLICATIONS

International Search Report of PCT/CN2020/089503.
1OA of CN201911151362.X.
The extended European search report of EP20805634.1.

*Primary Examiner* — John Bastianelli

(57) ABSTRACT

Disclosed is a nut assembly for an electronic expansion valve, an electronic expansion valve, and a limiting element mounting method. The nut assembly comprises a nut base, having a first end and a second end opposite to each other; a stop guide rail, sleeved on the nut base; a check ring, sleeved on the nut base and capable of helically rotating with respect to the nut base along the stop guide rail; and a limiting element, provided at the first end of the nut base The limiting element mounting method comprises the following steps: enabling the limiting element to be sleeved on the nut (Continued)

base, and enabling a second limiting boss to extend from a groove opening of a first limiting groove into the first limiting groove; and enabling, by means of the limiting element, the second limiting boss to slide into a corresponding second limiting groove.

18 Claims, 12 Drawing Sheets

(51) Int. Cl.
- *F16B 37/04* (2006.01)
- *F16K 1/32* (2006.01)
- *F25B 41/31* (2021.01)
- *F16B 21/04* (2006.01)

(52) U.S. Cl.
CPC .............. *F25B 41/31* (2021.01); *F16B 21/04* (2013.01); *F25B 2341/06* (2013.01)

(58) Field of Classification Search
USPC ........................................................ 251/322
See application file for complete search history.

(56) References Cited

U.S. PATENT DOCUMENTS

| 9,541,315 B2* | 1/2017 | Zhan ..................... F25B 41/35 |
| 2004/0003603 A1 | 1/2004 | Saeki et al. |
| 2006/0273272 A1* | 12/2006 | Uchida ................... F16K 31/04 |
| | | 251/129.11 |
| 2015/0184768 A1 | 7/2015 | Zhan |
| 2019/0368618 A1* | 12/2019 | Wei ........................ F16K 1/52 |

FOREIGN PATENT DOCUMENTS

| CN | 104930764 A | 9/2015 |
| CN | 204784967 U | 11/2015 |
| CN | 106246983 A | 12/2016 |
| CN | 106763989 A | 5/2017 |
| CN | 107606293 A | 1/2018 |
| CN | 105333197 B | 3/2018 |
| CN | 210265912 U | 4/2020 |

* cited by examiner

NUT ASSEMBLY FOR ELECTRONIC EXPANSION VALVE, ELECTRONIC EXPANSION VALVE, AND LIMITING ELEMENT MOUNTING METHOD

CROSS-REFERENCE TO RELATED APPLICATIONS

This application is a National Stage application of International Application No. PCT/CN2020/089503 filed on May 10, 2020, which claims all benefits accruing under 35 U.S.C. § 119 from China Patent Application Nos. 201910389712.X, filed on May 10, 2019, 201911151362.X, filed on Nov. 21, 2019, and 201920667717.X, filed on May 10, 2019, in the China National Intellectual Property Administration, the content of which is hereby incorporated by reference.

TECHNICAL FIELD

The present disclosure relates to the field of electronic expansion valve, and in particular to a nut assembly of an electronic expansion valve, an electronic expansion valve, and a method for mounting a limiting element.

BACKGROUND

An electronic expansion valve includes a rotator assembly, a nut assembly, a valve needle assembly, and a valve base. The valve base is provided with a valve port. The rotator assembly is configured for driving the valve needle assembly to move, so as to control the valve port to open. The nut assembly includes a nut base, an elastic member and a check ring. The check ring can move along a direction of an axis of the nut base on the elastic member. When the check ring moves to a top or a bottom of the elastic member, the check ring abuts against the elastic member to realize upper backstop and lower backstop, so as to limit the number of rotating of the rotator assembly.

However, when the check ring abuts against the elastic member, the elastic member can deform easily due to elasticity of the elastic member, causing inaccurate positioning.

SUMMARY

On the basis of embodiments of the present disclosure, the present disclosure provides a nut assembly of an electronic expansion valve, an electronic expansion valve, and a method for mounting a limiting element A nut assembly of an electronic expansion valve, including: a nut base having a first end and a second end opposite to each other; a stop guide rail sleeved on the nut base; a check ring sleeved on the nut base sleeved on the nut base, which is configured to spirally rotate relative to the nut base along the stop guide rail; and, a limiting element disposed at the first end of the nut base, which is configured to limit movement of the stop guide rail along an axis of the nut base on the nut base, and to limit rotation of the check ring.

An electronic expansion valve including a nut assembly.

A method for mounting the limiting element which includes:

sleeving the limiting element on the nut base and making the second limiting protrusion inserting into the first limiting groove though the notch of the first limiting groove; and rotating the limiting element to make the second limiting protrusion sliding into the corresponding second limiting groove.

BRIEF DESCRIPTION OF THE DRAWINGS

In order to more clearly illustrate the technical solutions in the embodiments of the present disclosure, the following will briefly introduce the drawings needed in the embodiments. Obviously, the drawings in the following description are only some embodiments of the present disclosure. For one of ordinary skill in the art, other drawings can be obtained from these drawings without creative work.

Figure 1:
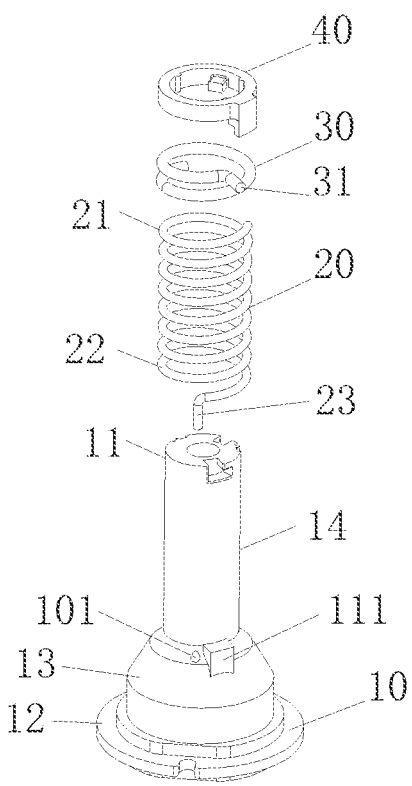
FIG. 1 is an explosive view of a nut assembly in a first embodiment of the present disclosure.
Figure 2:
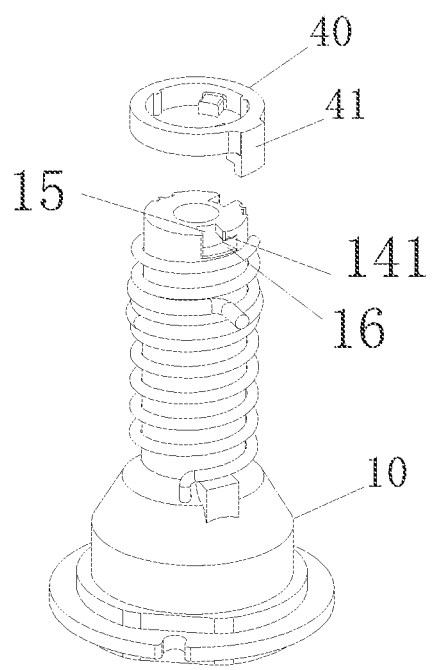
FIG. 2 is another explosive view of a nut assembly in the first embodiment of the present disclosure.
Figure 3:
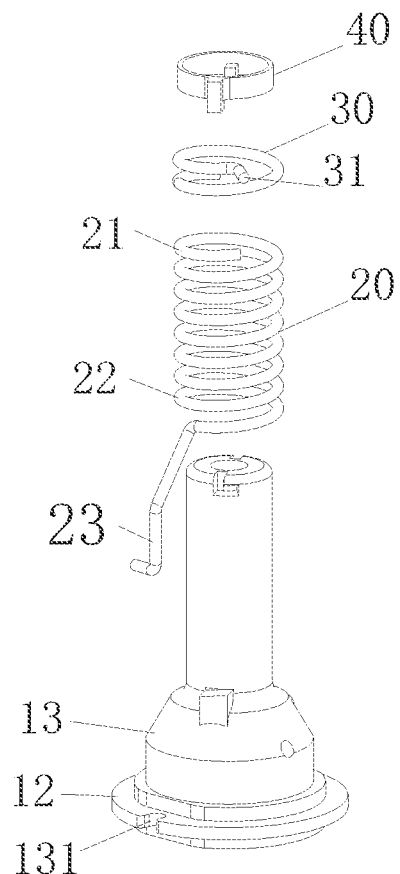
FIG. 3 is an explosive view of another structure of a nut assembly in the first embodiment of the present disclosure.
Figure 4:
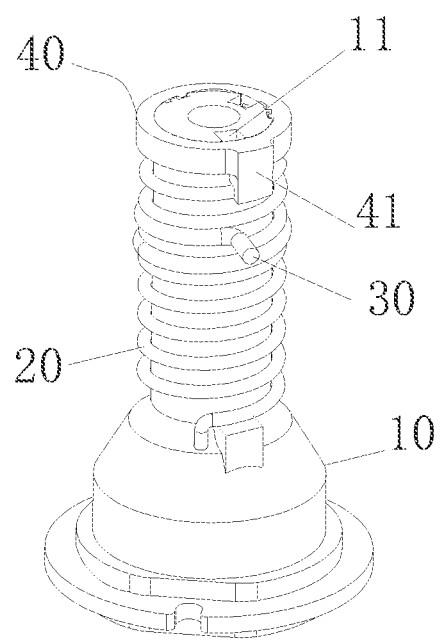
FIG. 4 is a structural schematic diagram of a limiting element in an initial state in the first embodiment of the present disclosure.

10 represents a nut base; 11 represents a first end of a nut base; 12 represents a second end of a nut base; 13 represents a base; 131 represents a connecting groove; 14 represents a mandrel; 141 represents a first limiting protrusion; 15 represents a first limiting groove; 16 represents a second limiting groove; 17 represents a recessing groove; 18 represents a third limiting groove; 19 represents a stopping protrusion; 101 represents a limiting hole; 111 represents a mounting portion; 1111 represents a mounting groove; 1112 represents a second rib; 20 represents a stop guide rail; 21 represents a third end of the stop guide rail; 22 represents a fourth end of the stop guide rail; 23 represents a first bending section; 30 represents a check ring; 31 represents a stopping portion; 40 represents a limiting element; 41 represents a limiting portion; 411 represents a first plane; 412 represents a second plane; 413 represents a notch; 414 represents a first rib; 42 represents a second limiting protrusion; 43 represents a third limiting protrusion; 50 represents a valve assembly; 60 represents a rotator assembly; 70 represents a valve seat.

DETAILED DESCRIPTION

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in this disclosure, all other embodiments obtained by one of ordinary skill in the art without creative work are within the scope of protection of this disclosure.

It should be noted that when a component is referred to as being "arranged on" another component, it can be directly on the other component or a central component may also exist. When a component is considered to be "disposed on" another component, it can be directly installed on another component or a centered component may exist at the same time. When a component is considered to be "fixed" to another component, it can be directly fixed to the other component or there may be a centered component at the same time.

It should be noted that in the description of the present disclosure, the orientation or positional relationship indicated by the involved orientation words such as "front, back, up, down, left, right", "horizontal, vertical, perpendicular, horizontal" and "top, bottom" are usually based on the orientation or positional relationship shown in the drawings, which is only for the convenience of describing the disclosure and simplifying the description. Unless otherwise stated, these orientation words do not indicate or imply that the device or element referred to must have a specific orientation or be constructed and operated in a specific orientation, and therefore cannot be construed as a limitation on the protection scope of the present disclosure. The orientation words "inner and outer" refer to the inner and outer parts relative to the contour of each component itself.

Unless otherwise defined, all technical and scientific terms used herein have the same meaning as commonly understood by one of ordinary skill in the art of this disclosure. The terminology used in the specification of the disclosure herein is only for the purpose of describing specific embodiments, and is not intended to limit the disclosure. The term "or/and" as used herein includes any and all combinations of one or more related listed items.

Referring to FIG. 1 to FIG. 16, a first embodiment of the present disclosure provides a nut assembly, which can include a nut base 10, a stop guide rail 20, a check ring 30 and a limiting element 40. Both the stop guide rail 20 and the check ring 30 can be sleeved on the nut base 10. The stop guide rail 20 can be a slide rail to lead the check ring 30 moving along the stop guide rail 20, so that the check ring 30 can spirally rotate relative to the nut base 10 along the stop guide rail 20. The limiting element 40 can be disposed on the nut base 10, which can be configured to limit a position of the stop guide rail 20 on the nut base 10 along an axis of the nut base 10, so as to prevent the stop guide rail 20 from falling off from the nut base 10, and can be configured to limit rotation of the check ring 30.

The nut base 10 can have a first end 11 and a second end 12 opposite to each other. The limiting element 40 can be disposed at the first end 11 of the nut base 10.

The nut base 10 can include a base 13 and a mandrel 14. The base 13 can be mounted on the mandrel 14, and the mandrel 14 can be in a cylinder shape. Both the stop guide rail 20 and the check ring 30 can be sleeved on the mandrel 14. An end of the mandrel 14 away from the base 13 can be defined as the first end of the nut base 10, and an end of the base 13 away from the mandrel 14 can be defined as the second end of the nut base 10.

The stop guide rail 20 can have a third end 21 and a fourth end 22 opposite to each other. The limiting element 40 can be provided with a limiting portion 41. By penetrating the third end 21 of the stop guide rail 20 through the limiting portion 41, the limiting portion 41 can limit displacement of the third end 21 of the stop guide rail 20 in a radial direction of a cross section of the nut base 10 along the axis of the nut base 10, and the third end 21 of the stop guide rail 20 is free in circumferential direction of the nut base 10.

In some embodiments, the stop guide rail 20 can be an elastic member. In some embodiments, the elastic member can be a spring or other members having elasticity.

In some embodiments, the check ring 30 can be provided with a stopping portion 31. The limiting portion 41 can cooperate with the stopping portion 31 to limit and stop the check ring 30. That is, the stopping portion 31 can cooperate with the limiting portion 41 to limit rotation of the check ring 30. At this time, the stop guide rail 20 only plays a role of guide rail, and the stop guide rail 20 will not deform, thereby promoting positioning accuracy.

In a nut assembly of the present embodiment, by penetrating the third end 21 of the stop guide rail 20 on the limiting portion 41, the limiting portion 41 can limit displacement of the third end 21 of the stop guide rail 20 in a radial direction of a cross section of the nut base 10 along the axis of the nut base 10, and the third end 21 of the stop guide rail 20 can be free in the circumferential direction of the nut base 10. Using the above structure, when the limiting portion 41 cooperates with the stopping portion 31 to stop and limit the check ring 30, the stop guide rail 20 merely plays a role of slide rail. The stop guide rail 20 will not deform, facilitates processing, and can limit the check ring 30 while improving positioning accuracy. In addition, since backstop is hard stop, the backstop position is more accurate, and an initial position of the electronic expansion valve is more accurate.

The limiting element 40 can stop and limit the check ring 30, including stopping and limiting the limiting element 40 at the top and the bottom. By disposing the limiting element 40 on the nut base 10 at a position near the first end 11 or near the second end 12, the limiting element 40 can stop and limit the check ring at the top or the bottom. By contemporarily disposing the limiting elements 40 on the nut base 10 at positions near the upper end and the lower end of the nut base 10, the limiting element 40 can stop and limit the check ring 30 at the top and the bottom.

Figure 5:
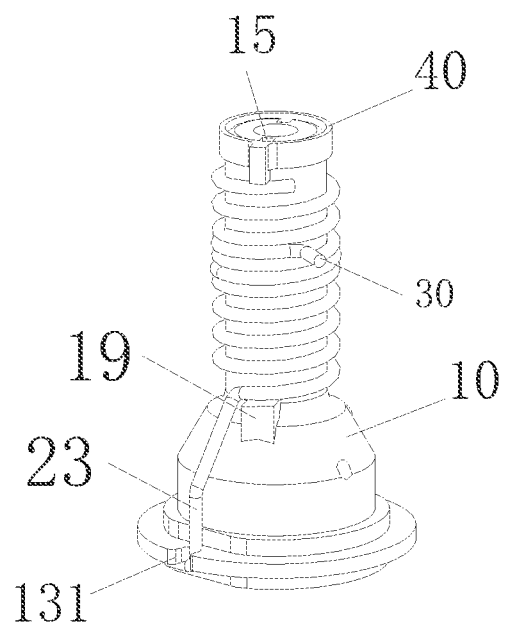
FIG. 5 is another structural schematic diagram of a limiting element in an initial state in the first embodiment of the present disclosure.
Figure 6:
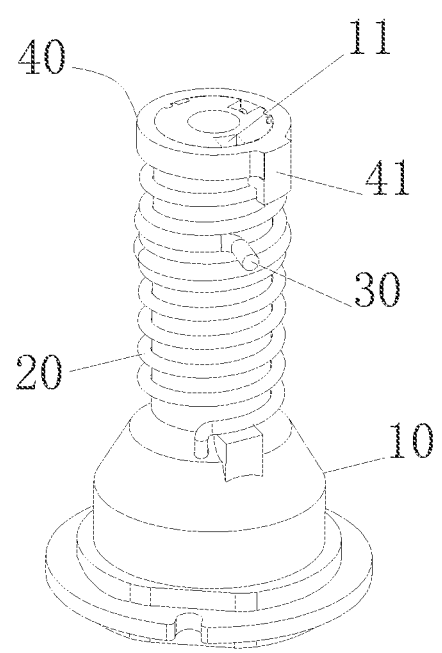
FIG. 6 is a structural schematic diagram of a limiting element at a limiting state in the first embodiment of the present disclosure.
Figure 7:
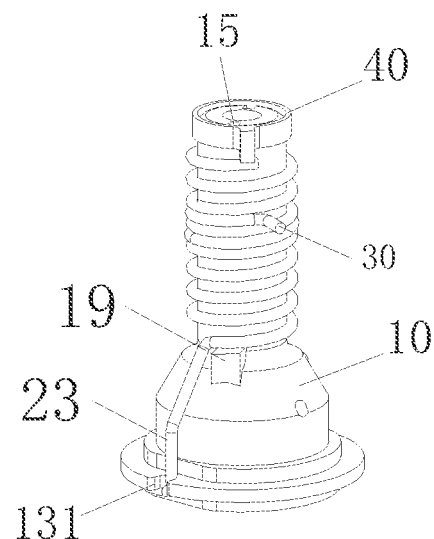
FIG. 7 is another structural schematic diagram of a limiting element in an initial state in the first embodiment of the present disclosure.
Figure 8:
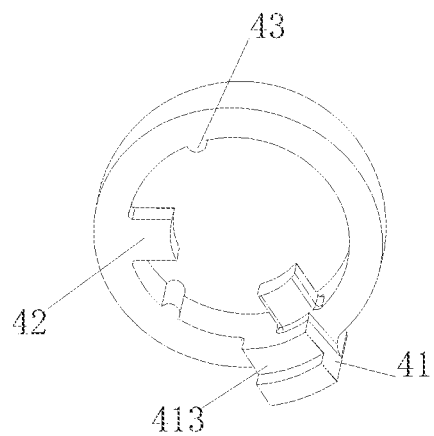
FIG. 8 is a structural schematic diagram of a limiting element in FIG. 1.
Figure 9:
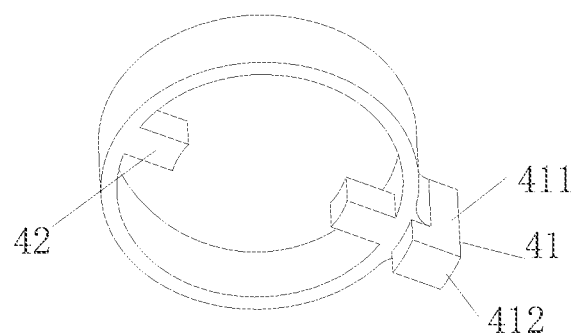
FIG. 9 is a structural schematic diagram of a limiting element in FIG. 3.
Figure 10:
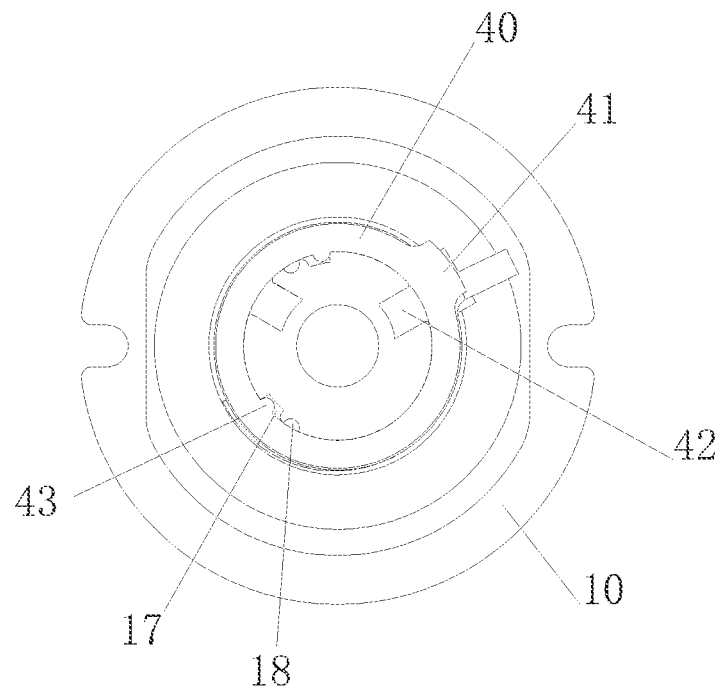
FIG. 10 is a top view of a limiting element in an initial state in the first embodiment of the present disclosure.
Figure 11:
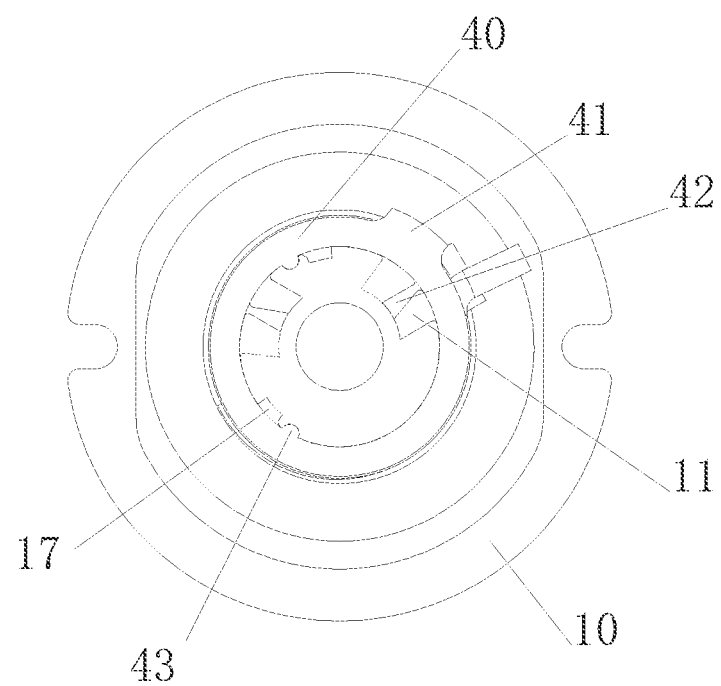
FIG. 11 is a top view of a limiting element in a limiting state in the first embodiment of the present disclosure.
Figure 12:
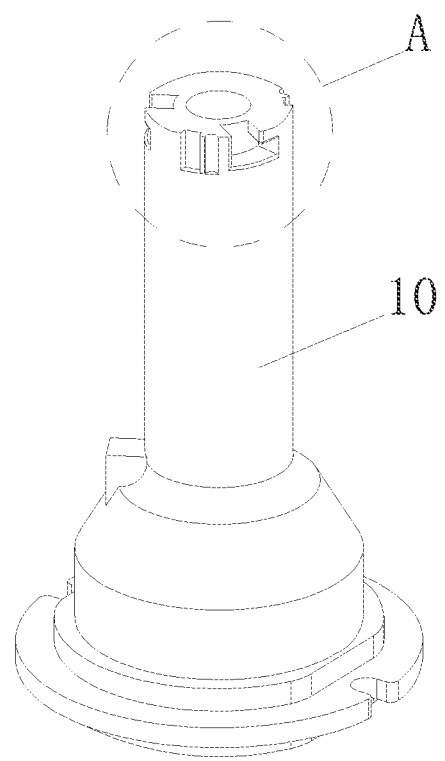
FIG. 12 is a structural schematic diagram of a nut base in FIG. 1.
Figure 13:
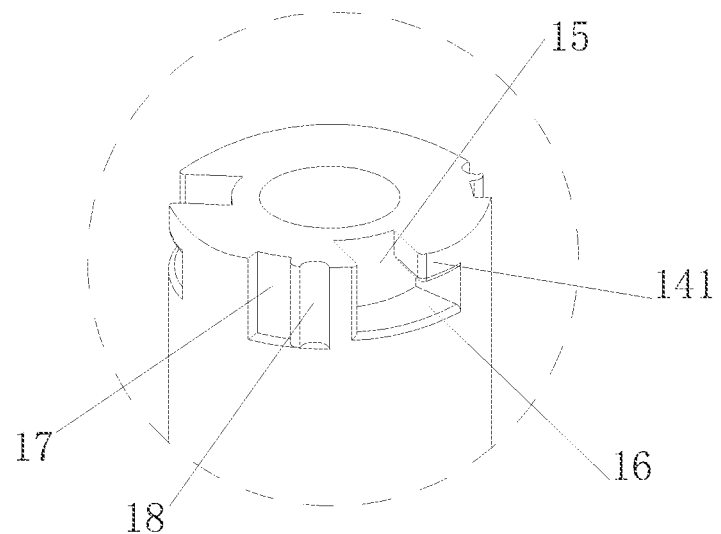
FIG. 13 is a partial enlarged diagram at portion A of FIG. 12.
Figure 14:
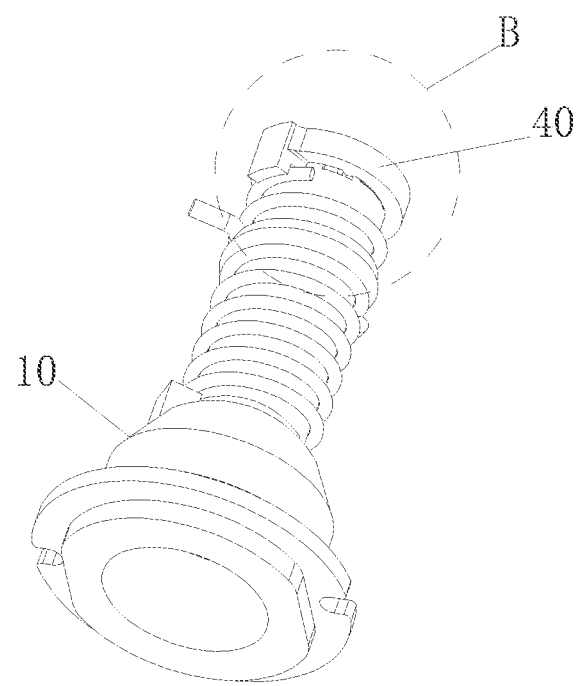
FIG. 14 is a structural schematic diagram of a nut assembly in a first embodiment of the present disclosure.
Figure 15:
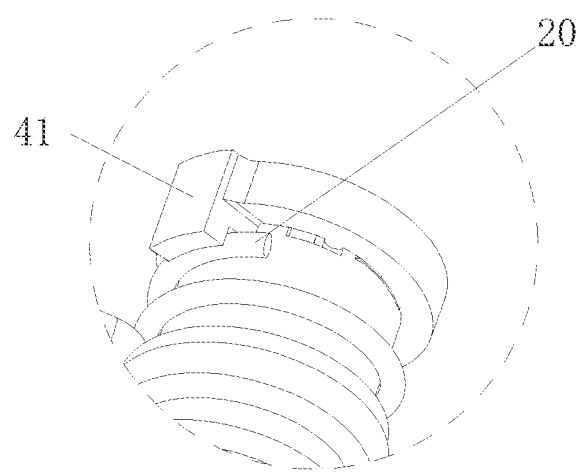
FIG. 15 is a partial enlarged diagram at portion B of FIG. 14.
Figure 16:
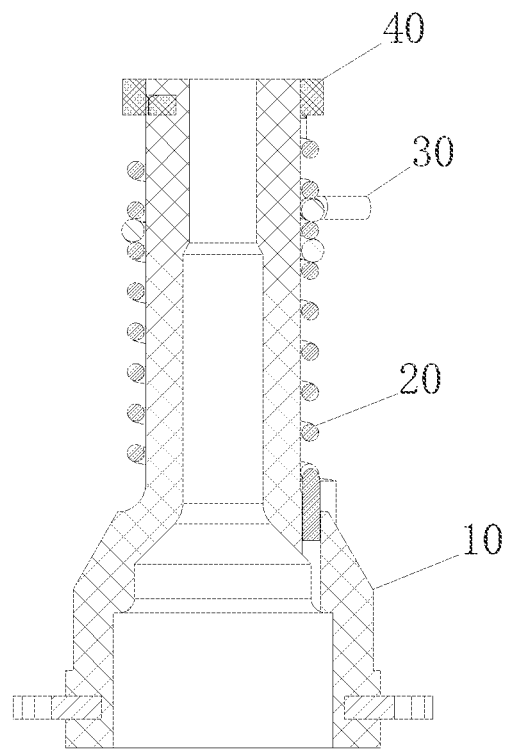
FIG. 16 is a cross-section view of a nut assembly in the first embodiment of the present disclosure.

In some embodiments, referring to FIG. 5 or FIG. 7, the check ring 30 can be stopped and limited at the top and the bottom by other methods, and is not restricted to the limiting element 40. For example, the nut base 10 can be provided with corresponding stopping protrusion 19, and the check ring 30 can cooperate with the stopping protrusion 19 to stop and limit the check ring 30 at the top and the bottom.

Specifically, the limiting portion 41 has a first plane 411. When the check ring 30 rotates to an end of the stop guide rail near the limiting element 40, the stopping portion 31 can abut against the first plane 411, so that the limiting element 40 can stop and limit the check ring along the circumferential direction.

In the present embodiment, the limiting element 40 can be in a ring shape. By sleeving the limiting element 40 on the first end of the nut base 10, the third end 21 of the stop guide rail 20 can abut against a surface of the limiting element 40 near the nut base 10, so that the limiting element 40 can limit a position of the stop guide rail 20 on the nut base 10 along the axis of the nut base 10.

The limiting portion 41 can further have a second plane 412 perpendicular to the first plane 411, and the third end 21 of the stop guide rail 20 can abut against the second plane 412, so that the limiting portion 41 can limit a position of the guide rail 20 along the axis of the nut base 10, thereby preventing the stop guide rail 20 from separating from the nut base 10.

It should be understood that the third end 21 of the stop guide rail 20 can abut against the second plane 412, and the fourth end 22 can abut against the stopping protrusion 19 or the limiting element 40. Therefore, when the first plane 411 stops the check ring 30 rotating, the check ring 30 will not contact the stop guide rail 20. That is, a top end of the stop guide rail 20 will not suffer from a stopping force, and the limiting element 40 can suffer independently from the stopping force. The stop guide rail 20 cannot deform, so that the stop guide rail 20 will not influence sliding of the check ring 30. At the same time, the limiting element 40 is an inelastic member, and will not cause stopping resilience, thereby increasing reliability. In addition, the third end 21 of the stop guide rail 20 does not have a special structure, which is simple to process, and has a size easy to be controlled.

The limiting portion 41 can protrude out from an end of the limiting element 40 near the nut base 10. There is an interval between a part of the limiting portion 41 protruding out from the limiting element 40 near the nut base 10 and the out wall of the nut base 10, which facilitates the third end 21 of the stop guide rail 20 penetrating through the interval, so that the limiting portion 41 can limit displacement of the third end 21 of the stop guide rail 20 in a radial direction of a cross section of the nut base 10 along the axis of the nut base 10.

In some embodiments, a notch 413 can be located on a side of the limiting portion 41 towards the nut base 10, and the third end 21 of the stop guide rail 20 can penetrate through the notch 413. In some embodiments, the notch 413 can be located at an end of the limiting portion 41.

In order to improve fitting effect between the limiting portion 41 and the stop guide rail 20, and prevent the limiting portion 41 from limiting displacement of the stop guide rail 20 along a circumferential direction of the nut base 10, a shape and a size of the notch 413 can match with a shape and a size of the end of the stop guide rail 20, respectively. In some embodiments, an inner wall of the notch 413 can be a hook surface.

At the same time, the inner wall of the notch 413 can replace the second plane 412. The third end 21 of the stop guide rail 20 can cooperate with the inner wall of the notch 413 to limit a position of the stop guide rail 20 along the axis of the nut base 10.

In order to prevent the limiting element 40 from falling off from the nut base 10, a first limiting structure can be disposed between the limiting element 40 and the nut base 10, and the first limiting structure can be configured to limit movement of the limiting element 40 along the axis of the nut base 10. The first limiting structure can include such a structure including a protrusion and a groove matching with each other, or a dowel limiting structure, or a fastener limiting structure.

The limiting element 40 can be in an initial state and in a limiting state, and the limiting element 40 can rotate relative to the nut base 10, so that the limiting element 40 can move between the initial position and the limiting position. When the limiting element 40 is in the initial state, the limiting element 40 can move towards the nut base 10 along the axis of the nut base 10. When the limiting element 40 is located at the limiting position, the limiting element 40 cannot move towards the nut base 10 along the axis of the nut base 10. Therefore, the limiting element 40 will not fall off from the nut base 10. In the present embodiment, when rotating the limiting element 40, a rotation direction of the limiting element 40 is in accordance with the direction of the up backstop.

Specifically, in order to limit the limiting element 40 along the axis of the nut base 10, the first end 11 of the nut base 10 can be provided with a first limiting groove 15 and a second limiting groove 16 communicating with each other. A notch of the first limiting groove 15 can be located at an end surface of the first end 11 of the nut base 10, and a notch of the second limiting groove 16 can be located at a side of the first end 11 of the nut base 10. In other words, a first limiting protrusion 141 can be disposed on the wall of the first limiting groove 15, and there is an interval between the first limiting protrusion 141 and a bottom of the first limiting groove 15. A second limiting protrusion 42 can be disposed on the inner wall of the limiting element 40. When the limiting element 40 is in the initial state, the second limiting protrusion 42 can be disposed corresponding to the notch of the first limiting groove 15. At this time, the second limiting protrusion 42 can be accommodated in the first limiting groove 15. When the limiting element 40 is in the limiting state, the second limiting protrusion 42 can move to the second limiting groove 16, i.e., moving to a place between the first limiting protrusion 141 and the bottom of the groove. At this time, movement of the limiting element 40 along the axis of the nut base 10 can be limited by cooperation of the first limiting protrusion 141 and the second limiting groove 16 or the second limiting protrusion 42, so as to fix the limiting element 40 in the direction of the axis of the nut base 10.

In the present embodiment, an upper surface of the first limiting protrusion 141 can be parallel to an end surface of the first end 11 of the nut base 10. Therefore, the nut base 10 can be integrated, which facilitates processing the nut base 10. In addition, the second limiting protrusion 42 can be disposed at a lower side of an inner wall of the limiting element 40.

When the limiting element 40 is in the limiting state, the stop guide rail 20 can abut against a surface of the limiting element 40 near the stop guide rail 20, and the stop guide rail 20 can be in a compression state at this time. That is, when the limiting element 40 rotates, the second plane 412 can abut against the third end 21 of the stop guide rail 20 from beginning to end. Therefore, under elastic force of the stop guide rail 20, the first limiting protrusion 141 can abut against the second limiting protrusion 42, and can further improve the limiting effect of the limiting element 40 along the axis of the limiting element 40.

Specifically, when the limiting element 40 is in the limiting state, the upper surface of the limiting element 40 can be parallel to the end surface of the first end 11 of the nut base 10. Therefore, the nut base 10 can be integrated, and avoid blocking the assembly and working of other parts.

The stop guide rail 20 can be in free state and extend without the limiting element 40. At this time, a height of the stop guide rail 20 can be larger than or equals to a height of the stop guide rail 20 after the limiting element 40 is mounted on the nut base 10. When the limiting element 40 is mounted on the nut base 10 and in the limiting state, the first end of the stop guide rail 20 can be located in the limiting portion 41 and the stop guide rail 20 can be in the compression state. The stop guide rail 20 can supply elastic force on the limiting element 40, and can reduce risk of sliding of the limiting element 40 caused by vibration.

In the present embodiment, a side wall of the nut base 10 can be provided with a plurality of the first limiting grooves 15. The plurality of first limiting grooves 14 can be annularly disposed on the side wall of the nut base 10. A plurality of second limiting protrusions 42 can be disposed on the inner wall of the limiting element 40, and the plurality of first limiting grooves 15 can be disposed corresponding to the plurality of second limiting protrusions 42, thereby further improving limiting effect. In the present embodiment, the side wall of the nut base 10 can be provided with two first limiting grooves 15, and the inner wall of the limiting element 40 can be provided with two second limiting protrusions 42.

At the same time, the number of the second limiting grooves can be a plurality. A plurality of second limiting grooves 16 can be correspondingly disposed to the plurality of first limiting grooves 15, respectively. The plurality of second limiting grooves 16 can be perpendicular to the plurality of first limiting grooves 15 to define an L-shaped positioning groove.

In some embodiments, the plurality of first limiting grooves 15 can be non-central symmetrically disposed. The nut base 10 can have advantages of high strength of stress and anti-warping. In some embodiments, the plurality of first limiting grooves 15 can be uniformly disposed on the side wall of the nut base 10.

In the present embodiment, a second limiting structure can be disposed between the limiting element 40 and the nut base 10, and can be configured to limit the limiting element 40 to rotate relative to the nut base 10. The second limiting structure can include a protrusion and a structure matching with the limiting groove, or a dowel limiting structure, or a fastener limiting structure.

Specifically, the out wall of the nut base 10 can be provided with a recessing groove 17 and a third limiting groove 18, and the recessing groove 17 and the third limiting groove 18 can be disposed at intervals. By disposing the third limiting protrusion 43 on the inner wall of the limiting element 40, when the limiting element 40 is in the initial state, the third limiting protrusion 43 can be disposed correspondingly to the recessing groove 17. And, when the limiting element 40 is in the limiting state, the third limiting protrusion 43 can move from the recessing groove 17 into the third limiting groove 18, and the third limiting protrusion 43 can cooperate with the third limiting groove 18 to limit rotation of the limiting element 40, so as to fix the limiting element 40 circumferentially. In addition, while sleeving the limiting element 40 on the nut base 10, the recessing groove 17 and the third limiting protrusion 43 can play a role of guiding. In the present embodiment, the limiting element 40 can be made of a rigid material. Since the limiting element 40 is in a ring shape, when the limiting element 40 is sleeved on the nut base 10 and rotating, the limiting element 40 can slightly deform, so that the third limiting protrusion 43 can move into the third limiting groove 18.

In the present embodiment, both the recessing groove 17 and the third limiting groove 18 can extend along the axis of the nut base 10. Both a notch of the recessing groove 17 and a notch of the third limiting groove 18 can be located on the upper surface of the nut base 10, so as to facilitate sleeving the limiting element 40 on the nut base 10.

A shape of cross-section of the third limiting groove 18 can include semicircle, U-shape and triangle. Besides, a shape and a size of the third limiting protrusion 43 can match with a shape and a size of the third limiting groove 18, respectively. In the present embodiment, a cross-section of the third limiting groove 18 can be in a semicircle shape.

In the present embodiment, a side wall of the recessing groove 17 near the third limiting groove 18 can be a hook surface, so as to facilitate the third limiting protrusion 43 rotating from the recessing groove 17 to the third limiting groove 18.

In order to further improve limiting effect to the limiting element 40, a plurality of recessing grooves 17 and a plurality of third limiting grooves 18 can be disposed on the outer wall of the nut base 10. A plurality of third limiting protrusions 43 can be disposed on the inner wall of the limiting element 40, and each of the plurality of third limiting protrusions 43 can be disposed correspondingly to one of the plurality of recessing grooves 17 and one of the plurality of third limiting grooves 18.

In the present embodiment, a material of the limiting element can include nonmetal materials. Since the check ring 30 is spring steel wire, the nonmetal material hits against the metal, noise can be reduced.

In addition, since the stop guide rail 20 is free from the stopping force, a wire diameter of the stop guide rail 20 can be reduced. Therefore, by adjusting circles of the stop guide rail 20, a number of rotating of a rotator can be adjusted. That is, moving distance of a valve needle of the electronic expansion valve can be adjusted, and precision of flow rate can be adjusted. In addition, the stop guide rail 20 is simple to process, and has a size easy to be controlled.

In the present embodiment, the fourth end 22 of the stop guide rail 20 can have a first bending section 23. The first bending section 23 can bend along the axis of the stop guide rail 20. The nut base 10 can be provided with a limiting hole 101. The first bending section 23 can insert towards the limiting hole 101, so as to limit circumferential rotation of the stop guide rail 20. The mounting portion 111 of the nut base 10 can cooperate with the other end away from the stooping portion 31 of the check ring, to stop and limit the check ring 30 at the top and the bottom. A balancing hole can be a limiting hole. Therefore, the balancing hole not only can quickly balance pressure in the valve chamber and the nut base 10, but can also limit the fourth end of the stop guide rail 20 by the balancing hole.

In other embodiments, an end of the base 13 away from the mandrel 14 can be provided with a connecting groove 131, and a first bending section 23 can be fixed in the connecting groove 13, so as to fix the stop guide rail 20 on the mandrel 14, preventing the stop guide rail 20 from moving along with rotation of the check ring 30. In the present embodiment, the end of the base 13 away from the mandrel 14 can be integrally produced.

Specifically, the check ring 30 can have a second bending section. The second bending section can bend towards a direction away from the nut base 10, and the second bending section can define the stopping portion 31.

In some embodiments, the check ring 30 can be reversely mounted. The stopping portion 31 can cooperate with the mounting portion 111 of the nut base 10 to realize upper backstop and lower backstop. The end of the check ring 30 away from the stopping portion 31 can cooperate with the limiting portion 41 of the limiting element 40 to realize upper backstop and lower backstop.

Figure 17:
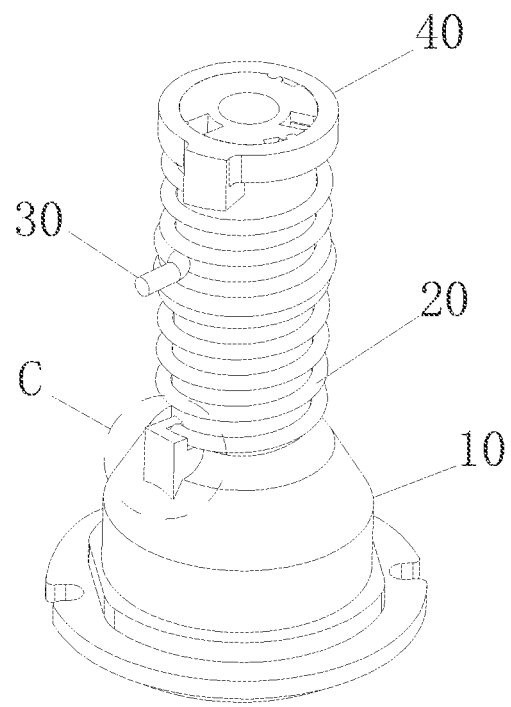
FIG. 17 is a structural schematic diagram of a nut assembly in a second embodiment of the present disclosure.
Figure 18:
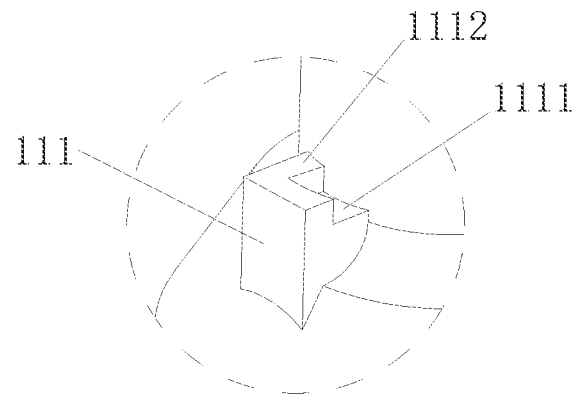
FIG. 18 is a partial enlarged diagram at portion C of FIG. 17.
Figure 19:
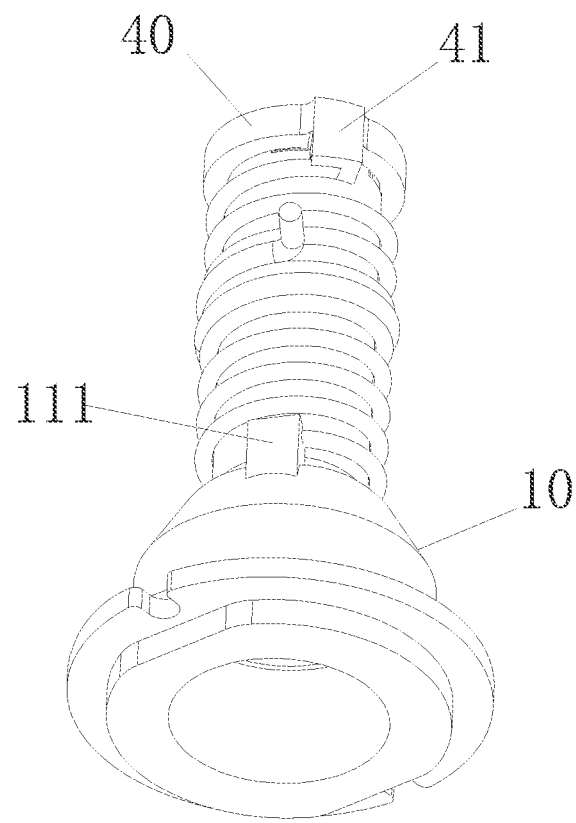
FIG. 19 is another structural schematic diagram of a nut assembly in embodiment 2 of the present disclosure.
Figure 20:
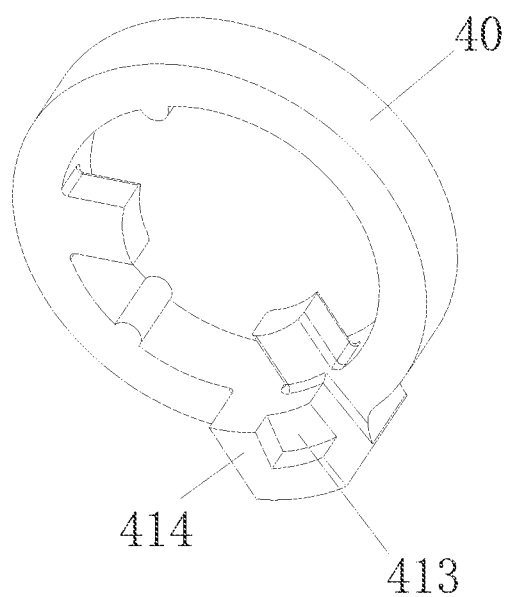
FIG. 20 is a structural schematic diagram of a limiting element in FIG. 18.
Figure 21:
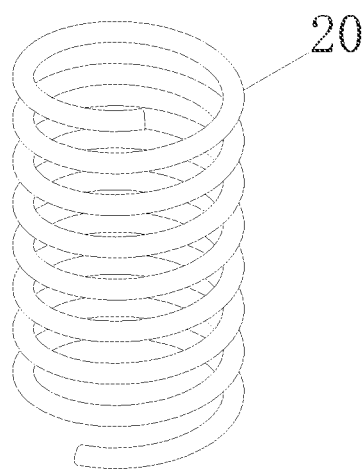
FIG. 21 is a structural schematic diagram of a stop guide rail in FIG. 18.

Referring to FIG. 17 and FIG. 21, a nut assembly is provided in a second embodiment of the present disclosure. Compared with the nut assembly in the first embodiment 1, both ends of the stop guide rail 20 can be provided with a bending section. Both a limiting portion 41 of the limiting element 40 and the nut base 10 can be provided with a mounting structure. The stop guide rail 20 can be mounted and fixed by the mounting structure to limit rotation of the stop guide rail relative to the nut base 10. The mounting structure can include mounting structures such as a matching structure having a groove and a rib, a dowel, a bolt and the like.

Specifically, a first rib 414 can be disposed at an end of the notch 413 of the limiting portion 41, and the first rib 414 can be disposed opposite to the third end of the stop guide rail 20. The stop guide rail 20 can be sleeved on the nut base 10. When the limiting element 40 is mounted on the nut base 10, the third end of the stop guide rail 20 can abut against the first rib 414, so as to limit the third end of the stop guide rail 20 along circumference of the nut base 10.

In addition, the nut base 10 can be provided with a mounting portion 111. The mounting portion 111 can be configured to limit the fourth end 22 of the stop guide rail 20 along circumference of the nut base 10. A mounting groove 1111 can be disposed at one side of the mounting portion 111 towards the nut base 10, and the fourth end 22 of the stop guide rail 20 can penetrate through the mounting groove 1111. Specifically, an end of the mounting groove 1111 can be provided with a second rib 1112, and the second rib 1112 can be disposed opposite to the end of the fourth end 22 of the stop guide rail 20. After sleeving the stop guide rail 20 on the nut base 10, the fourth end 22 of the stop guide rail 20 can be locate in the mounting groove 1111, and the end of the fourth end 22 of the stop guide rail can abut against the second rib 1112, so as to limit the second end of the stop guide rail 20 along circumference of the nut base 10.

Figure 22:
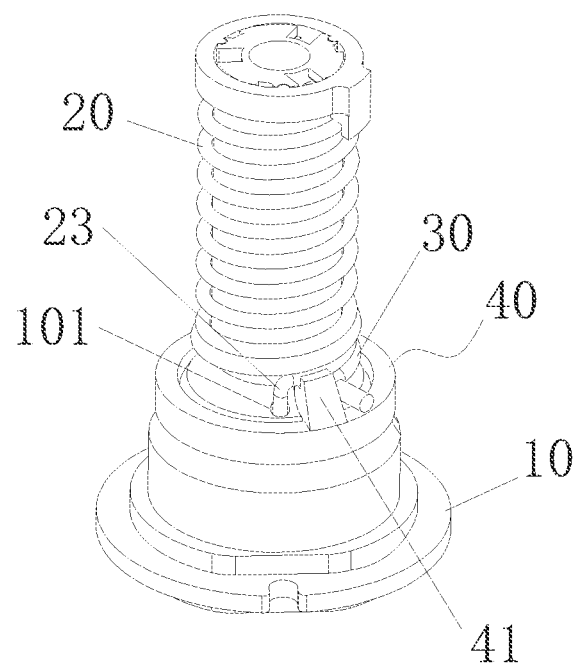
FIG. 22 is a structural schematic diagram of a nut assembly in a third embodiment of the present disclosure.

Referring to FIG. 22, a nut assembly is provided in a third embodiment of the present disclosure. Compared with the nut assembly in embodiment 1, a detachable limiting element 40 can be disposed on the nut base 10 near the second end 12 of the nut base in embodiment 3, and the limiting portion 41 in the limiting element 40 can stop and limit the check ring at the top and the bottom.

The limiting element 40 can be in a ring shape. The limiting element 40 can be sleeved on the nut base 10 at a position near the lower end of the nut base. The limiting element 40 can be provided with a limiting portion 41, and the limiting portion 41 can be disposed towards the stop guide rail 20.

Specifically, an accommodating groove can be disposed on the upper surface of the limiting portion 41 near the axis of the nut base 10. The stop guide rail 20 can be accommodated in the accommodating groove. The limiting portion 41 can limit the stop guide rail 20 in a radial direction of the nut base 10. In addition, by disposing the accommodating groove on the upper surface of the limiting portion 41, the height of the limiting portion 41 can be increased, so that reliability of up backstop and down backstop can be further ensured, thereby avoiding slippage of backstop. In addition, the limiting element 40 can support the stop guide rail 20, so that position of the stop guide rail 20 along the axis of the nut base 10 can be limited.

Figure 23:
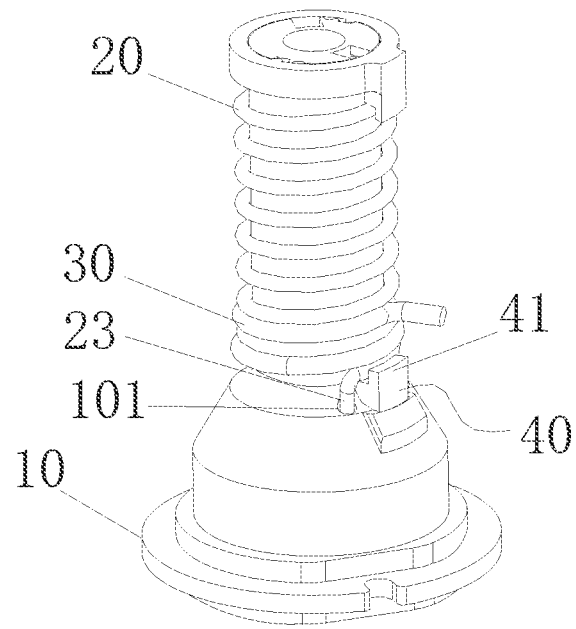
FIG. 23 is a structural schematic diagram of a nut assembly in a fourth embodiment of the present disclosure.

Referring to FIG. 23, a nut assembly is provided in a fourth embodiment of the present disclosure. Compared with the nut assembly in embodiment 1, a position on the nut base 10 near the bottom part of the nut base 10 in embodiment 4 can be provided with a detachable limiting element 40, and the limiting element 40 can stop and limit the check ring 30 at top and bottom.

The limiting element 40 can be a limiting block, the limiting element 40 can be inserted on the nut base 10, and the limiting element 40 and the limiting portion 41 can be disposed towards the stop guide rail 20.

Specifically, an accommodating groove can be disposed on the upper surface of the limiting portion 41 near the axis of the nut base 10. The stop guide rail 20 can be accommodated in the accommodating groove. The limiting portion 41 can limit the stop guide rail 20 in a radial direction of the nut base 10. In addition, by disposing the accommodating groove on the upper surface of the limiting portion 41, the height of the limiting portion 41 can be increased, so that reliability of up backstop and down backstop can be further ensured, thereby avoiding slippage of backstop. In addition, the limiting element 40 can support the stop guide rail 20, so that position of the stop guide rail 20 along the axis of the nut base 10 can be limited.

In some embodiments, an accommodating groove on the limiting portion 41 disposed near a lower end of the nut base 10 can be provided with a rib, so as to limit the stop guide rail 20 in the radial direction and circumferential direction of the nut base 10.

Figure 24:
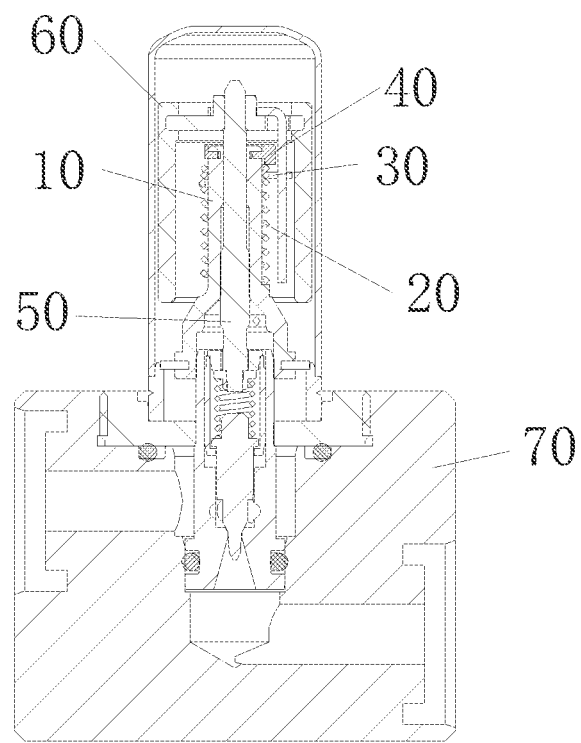
FIG. 24 is a structural schematic diagram of an electronica expansion valve of the present disclosure.

Referring to FIG. 24, the present disclosure provides an electronic expansion valve, which can include the nut assembly described above.

The electronic expansion can include a rotator assembly 60, a valve assembly 50 and a valve seat 70. The valve seat 70 can be provided with a valve port. The rotator assembly 60 can be configured for driving the valve assembly 50 to move to control lockage and opening of the valve port. Specifically, the rotator assembly can include a rotator and a stirring member. An end of the stirring member is connected to the rotator, and the other end of the stirring member is connected to the check ring 30. When the rotator rotates, the rotator can drive the check ring 30 to move along the axis of the nut base 10 via the stirring member. The check ring 30 can cooperate with the limiting portion 41 of the limiting element 40 to carry out up backstop, and the check ring 30 can cooperate with the mounting portion 111 of the nut base 10 to carry out down backstop.

The device of the present embodiment includes the following benefits.

(1) A limiting portion 41 can be disposed on the limiting element 40, and can prevent the first end of the stop guide rail 20 from popping out. When the limiting element 40 is mounted on the nut base 10, a pretightening force can be increased by spinning the limiting element 40.

(2) Relying on pretightening force of the stop guide rail 20, a stop guide rail 20 can cooperate with the nut base 10 and the limiting element 40 to carry out limitation along the axis of the nut base 10.

(3) The limiting element 40 can be provided with a third limiting protrusion. The third limiting protrusion 43 can cooperate with the third limiting groove 18 to limit rotation of the limiting element 40 relative to the nut base 10, so as to prevent falling off of the device caused by vibration.

(4) A plurality of first limiting grooves 15 can be non-central symmetrically disposed. The nut base can have advantages of high strength of stress and anti-warping.

(5) The limiting hole 101 on the nut base 10 can contemporarily play a role of balancing hole, which can realize fixation of the fourth end 22 of the stop rail 20 while ensuring the penetration of the pressure inside and outside the nut base 10.

The present disclosure can further disclose a method for mounting the limiting element when applied in the nut assembly. The method can include the following steps:

S1, sleeving the limiting element 40 on the nut base 10 and making the second limiting protrusion 42 inserting into the first limiting groove 15 though the notch of the first limiting groove 15; and S2, rotating the limiting element 40 to make the second limiting protrusion 42 sliding into the corresponding second limiting groove 16.

Moreover, it should be noted that the use of terms such as "first" and "second" to define parts is only for the convenience of distinguishing corresponding parts. Unless otherwise stated, the above words have no special meaning and therefore cannot be understood as limiting the scope of protection of the present disclosure.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. A nut assembly of an electronic expansion valve, comprising:
    a nut base having a first end and a second end opposite to each other;
    a stop guide rail sleeved on the nut base and having a third end;
    a check ring sleeved on the nut base and capable of spirally rotating relative to the nut base along the stop guide rail; and
    a limiting element disposed at the first end of the nut base, which is configured to limit a movement of the stop guide rail on the nut base along an axis of the nut base, and to limit rotation of the check ring,
    wherein the limiting element is provided with a limiting portion, the third end of the stop guide rail penetrates through the limiting portion, and the limiting portion of the limiting element is capable of limiting a displacement of the third end of the stop guide rail in a radial direction of a cross section of the nut base along the axis of the nut base.

2. The nut assembly of claim 1, wherein the check ring is provided with a stopping portion, and the limiting portion cooperates with the stopping portion to limit and stop the check ring.

3. The nut assembly of claim 2, wherein the limiting portion has a first plane, the stopping portion abuts against the first plane when the check ring rotates to an end of the stop guide rail near the limiting element.

4. The nut assembly of claim 3, wherein the limiting portion further has a second plane perpendicular to the first plane, the third end of the stop guide rail abuts against the second plane.

5. The nut assembly of claim 2, wherein a notch is located on a side of the limiting portion towards the nut base, and an end of the stop guide rail near the limiting element penetrates through the notch.

6. The nut assembly of claim 1, wherein a first limiting structure is disposed between the limiting element and the nut base, and the first limiting structure is configured to limit a movement of the limiting element along the axis of the nut base.

7. The nut assembly of claim 1, wherein the limiting element has an initial state and a limiting state, wherein the limiting element is able to rotate relative to the nut base, so that the limiting element is capable of moving between an initial position and a limiting position,
    when the limiting element is in the initial state, the limiting element is able to move towards the nut base along the axis of the nut base,
    when the limiting element is in the limiting state, the limiting element is not able to move towards the nut base along the axis of the nut base.

8. The nut assembly of claim 7, wherein the first end of the nut base is provided with a first limiting groove and a second limiting groove communicating with each other, a notch of the first limiting groove locates at an end surface of the first end of the nut base, a notch of the second limiting groove locates at a side of the first end of the nut base, and a second limiting protrusion is disposed on an inner wall of the limiting element;
    when the limiting element is in the initial state, the second limiting protrusion is disposed opposite to the notch of the first limiting groove;
    when the limiting element is in the limiting state, the second limiting protrusion is located in the second limiting groove, and capable of limiting a movement of the limiting element along the axis of the nut base through a cooperation between the second limiting protrusion with an inner wall of the second limiting groove.

9. The nut assembly of claim 8, wherein the first end of the nut base is provided with a plurality of first limiting grooves, the inner wall of the limiting element is provided with a plurality of second limiting protrusions, and the plurality of limiting grooves matches with the plurality of second limiting protrusions, respectively.

10. The nut assembly of claim 9, wherein the plurality of first limiting grooves are non-central symmetrically disposed.

11. The nut assembly of claim 7, wherein when the limiting element is in the limiting state, the stop guide rail abuts against an end surface the limiting element near the nut base, and the stop guide rail in a compression state.

12. The nut assembly of claim 1, wherein a second limiting structure is disposed between the limiting element and the nut base, and is configured to limit rotation of the limiting element relative to the nut base.

13. The nut assembly of claim 7, wherein an out wall of the first end of the nut base is provided with a recessing groove and a third limiting groove, the recessing groove and the third limiting groove are disposed at intervals, and a third limiting protrusion is disposed on the inner wall of the limiting element;
- when the limiting element is in the initial state the third limiting protrusion is disposed corresponding to the recessing groove;
- when the limiting element is in the limiting state, the third limiting protrusion moves from the recessing groove into the third limiting groove, and the third limiting protrusion cooperates with the third limiting groove to limit rotation of the limiting element.

14. The nut assembly of claim 13, wherein both the recessing groove and the third limiting groove extend along the axis of the nut base, and both a notch of the recessing groove and a notch of the third limiting groove is located on the end surface of the first end of the nut base.

15. The nut assembly of claim 2, wherein both the limiting portion and the nut base are provided with mounting structures, and both ends of the stop guide rail abut against the mounting structures, respectively, so as to limit rotation of the stop guide rail relative to the nut base.

16. The nut assembly of claim 2, wherein the limiting portion is provided with a notch, a first rib is disposed at an end of the notch, the stop guide rail further has a fourth end opposite to the third end, and the third end abuts against the first rib; and
- a mounting portion is disposed on the nut base near the second end of the nut base, and is configured to limit the fourth end of the stop guide rail, circumferentially.

17. An electronic expansion valve, comprising the nut assembly of claim 1.

18. A method for mounting the limiting element, wherein the limiting element is applied in the nut assembly of claim 1, the method comprises,
- sleeving the limiting element on the nut base and making a second limiting protrusion inserting into a first limiting groove though a notch of the first limiting groove; and
- rotating the limiting element to make the second limiting protrusion sliding into a corresponding second limiting groove.

* * * * *